June 5, 1951  C. A. THOMAS  2,556,013
STATOR FOR UNIVERSAL ELECTRIC MOTORS
Filed March 29, 1949
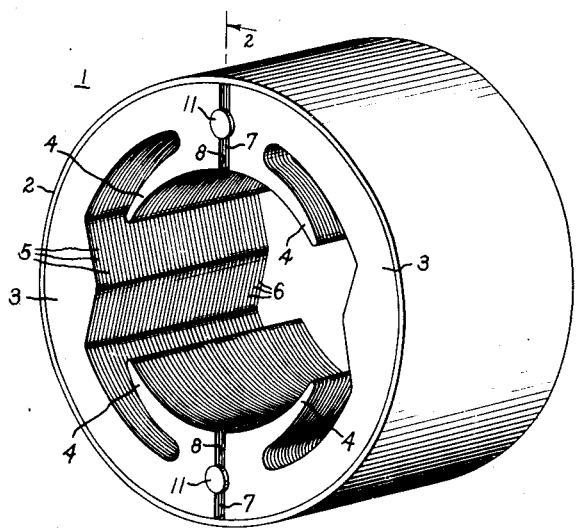
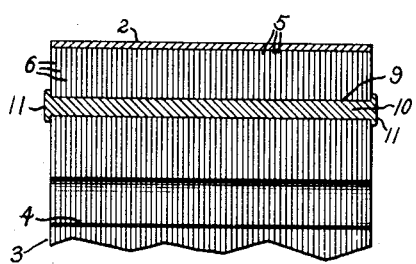
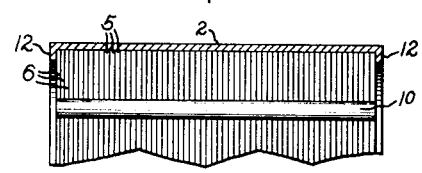
Inventor:
Charles A. Thomas,
by Powell S. Mack
His Attorney.

Patented June 5, 1951

2,556,013

UNITED STATES PATENT OFFICE 2,556,013

STATOR FOR UNIVERSAL ELECTRIC MOTORS

Charles A. Thomas, Fort Wayne, Ind., assignor to General Electric Company, a corporation of New York Application March 29, 1949, Serial No. 84,086

4 Claims. (Cl. 171—252)

My invention relates to dynamoelectric machines, and more particularly to dynamoelectric machines of the commutator type having stator members provided with salient field poles. More specifically, the invention relates to universal electric motors for operation on both alternating current and direct current, which are provided with salient pole stator members in which the magnetic structure is arranged to compensate for the armature reaction of the rotor members.

In commutator-type dynamoelectric machines it is necessary, for maximum efficiency, to effect substantial neutralization of the armature reaction at the point of commutation. This is especially important for universal motors which must operate on either alternating or direct current. Various means are employed to neutralize the armature reaction of such a motor, among which is the method of constructing the stator in a manner such that the field magnet structure of the stator automatically compensates for the armature reaction. One form of such a construction compensated stator has a magnetic structure which is divided by a layer of non-magnetic material through the center of each field pole along a plane coinciding with the center line of the motor. This construction permits approximately the same air gap flux as if the field poles and magnetic structure were not divided, but provides a high reluctance path for armature reaction flux through the magnetic structure of the stator, thus substantially neutralizing the armature reaction.

It is an object of this invention to provide an improved type of construction for construction compensated stator members of the divided pole type.

It is a further object of the invention to provide a type of construction for stator members of this type which is simple and inexpensive.

A still further object of my invention is the provision of a form of construction for stator members of the divided pole type which is readily adaptable to mass production techniques and procedures.

In carrying out my invention in one form, I provide a stator member for a dynamoelectric machine having an outer retaining ring of non-magnetic material. Positioned inside the retaining ring is the magnetic structure which comprises a divided circular yoke portion of laminated magnetic steel. On opposite sides of the center line of the stator, two projections extend radially inward from the yoke portion to form two field poles. Each such polar projection and the portion of the yoke from which it projects is split along a plane which coincides with the center line of the stator member. Each inner split surface of each yoke portion along this plane has a recess parallel to the center line of the stator in which is located a non-magnetic rivet. These rivets function as spacers to separate the two portions of the magnet structure and in addition they secure the combined yoke and pole members against the outer retaining ring. At the same time, at least one rivet has its projecting ends upset, forming flange-like projections to retain in the correct position the laminations of which the yoke portions are constructed.

For a more complete understanding of my invention, reference should be had to the accompanying drawing, Fig. 1 of which is a perspective view of a stator member embodying my invention; Fig. 2 is a partial view in section along the line 2 of Fig. 1; while Fig. 3 illustrates a modification of the invention.

Referring to Fig. 1 of the drawing, a stator member in which my invention is incorporated is designated generally by the numeral 1. The stator 1 has an outer cylindrical protective and retaining member 2 which is made of a non-magnetic material with good tensile strength qualities, such as aluminum or stainless steel.

Immediately inside the inner surface of member 2 is a substantially circular magnetic yoke portion composed of two separated duplicate yoke segments 3. The substantially semi-circular yoke segments 3 have two radially extending inward projections 4, each of which forms half of a salient field pole. Taken together, two adjacent, closely spaced, but slightly separated projections 4 form a field pole adaptable for the location thereon of a suitable exciting winding (not shown).

Yoke segments 3 and their inward projections 4 are laminated, being made of a plurality of relatively thin arcuate flat sheets 5 of magnetic material, preferably steel. The flat sheets 5 are positioned perpendicularly to the center line of stator member 1, with adjacent sheets being preferably separated by a thin layer 6 of electrically insulating material in order to substantially prevent eddy currents due to alternating magnetic flux in the magnet structure.

Yoke members 3 and polar projections 4 thereon are separated by diametrically opposed gaps or spaces 7 on opposite sides of the center line of stator 1. The spaces 7 are coplanar, with the plane along which they lie coinciding with the center line of stator 1 and the center lines of the field poles, thus dividing field poles 4, 4 into two equal portions and the circular magnetic yoke into two equal segments with each such segment having as a part thereof two polar projections 4.

Each inner surface 8 of a yoke segment 3 which faces a similar surface on the other like segment 3 has a longitudinal recess 9, best seen in Fig. 2, extending entirely across the surface 8 parallel to the center line of stator 1, adapted to contain with a similar recess 9 in the opposing like segment a rivet or other similar rod-like member. A rivet 10, made of non-magnetic material such as aluminum, stainless steel or bronze, is positioned between opposing surfaces of yoke segments 3 in recesses 9. Rivets 10 serve as spacers to separate yoke segments 3 and, in addition, the rivets serve to secure segments 3 within outer retaining ring 2. The latter is achieved by upsetting at least one of the rivets after it has been placed in the stator assembly, by hydraulic pressure or other suitable means, causing the rivet to expand and bias the yoke segments against the outer retaining ring. At the extremities of at least one rivet 10, flange-like portions 11 are formed during the upsetting process. Flanges 11 serve to compress the laminations of which the yoke segments 3 and their polar projections 4 are composed and retain them in the correct longitudinal position, thus making it unnecessary to provide separate means for this purpose.

A modification of my invention is illustrated by Fig. 3 on the accompanying drawing in which like numerals represent like parts with Fig. 1. In this modification, circular flanged portions 12 are provided on each edge of the outer cylindrical shell 2. This arrangement makes it unnecessary for spacer members 10 to have flanges at the ends thereof or to be upset after being placed in the stator assembly, as long as a reasonably snug fit is provided between spacers 10, laminations 5, and outer shell 2. In this modification, the laminations making up each semi-circular yoke segment 3 are placed within shell 2 and then pressed outward against the shell after which spacers 10 are inserted between the two yoke segments to maintain them in this position.

While the stator member 1 of the drawing has two polar projections, it will be readily apparent that this construction is equally applicable to multi-polar stators having four or more poles. Furthermore, while a laminated magnetic structure is shown, it will be readily understood that yoke segments of solid magnetic material may be used. A stator constructed in accordance with my invention is especially applicable to universal motors but may be used also for other commutator type dynamoelectric machines including series, shunt, and compound wound.

While I have illustrated and described one preferred embodiment of my invention, together with one modification thereof, additional modifications will occur to those skilled in the art and, therefore, it should be understood that I intend to cover by the appended claims any such modifications which fall within the true spirit and scope of my invention.

What I claim as new and desire to secure by Letters Patent of the United States is:

1. A stationary member for a dynamoelectric machine comprising a substantially cylindrical non-magnetic outer retaining ring, a substantially circular magnetic yoke portion positioned immediately adjacent the inner surface of said retaining ring, a polar projection extending radially inward from said yoke, a second polar projection diametrically opposite said first projection extending radially inward from said yoke, said yoke and said first-named and said second-named projections being divided by a non-magnetic medium along a diameter of said yoke extending substantially through the centers of said first-named and said second-named projections forming two substantially semi-circular magnetically separated yoke segments whereby a magnetic circuit having high reluctance is provided for armature reaction flux, a plurality of spacers of non-magnetic material positioned between said yoke segments, at least one of said non-magnetic spacers being upset whereby said yoke segments are forced against and tightly secured within said retaining ring.

2. An armature reaction compensated stator member for a commutator type motor, said stator member comprising a substantially circular magnetic yoke portion, a projection extending radially inward from said yoke to form one field pole, a diametrically opposed second projection extending radially inward from said yoke to form a second field pole, said yoke and said first-named projection and said second-named projection being divided by an air gap along a plane coinciding with said center line and passing through the centers of said first-named projection and said second-named projection forming two semi-circular yoke segments whereby a path of high reluctance is provided for armature reaction flux, each of said segments having a groove in each of the surfaces adjacent to said gap parallel to said center line adapted to contain a portion of a spacer member, a plurality of non-magnetic spacer members positioned between said yoke segments in said grooves, and an outer circular retaining member of non-magnetic material around the outer periphery of said yoke segments, at least one of said spacer members being upset whereby said yoke segments are tightly secured within said retaining member.

3. In an electric motor of the universal type for operation on either alternating current or direct current, an armature reaction compensated stator comprising an outer cylindrical casing member of non-magnetic material, two combination yoke and pole members substantially semi-circular in form positioned adjacent the inner surface of said casing member to form a substantially circular magnet structure, each of said yoke and pole members comprising a plurality of laminations of magnetic steel, each of said yoke and pole members having inwardly extending portions forming half of two magnetic field poles, and non-magnetic rivet members positioned parallel to the center line of said stator separating said two combination yoke and pole members, the two said yoke and pole members forming together two opposite field pole projections magnetically divided by said rivet members along a common plane through said center line, said rivet members forcing said yoke and pole members against and retaining them within said casing member and at least one of said rivet members extending beyond said combination yoke and pole members and having flanged projections on the ends thereof to retain said laminations in position.

4. An armature reaction compensated stator member for a commutator type motor, said stator member comprising a substantially circular magnetic yoke portion composed of a plurality of flat layers of magnetic steel, a projection extending radially inward from said yoke to form one field pole, a diametrically opposed second projection extending radially inward from said yoke to form a second field pole, said yoke and said first-named projection and said second-named projection being divided by an air gap along a plane coinciding with said center line and passing through the centers of said first-named projection and said second-named projection forming two semi-circular yoke segments whereby a magnetic circuit of high reluctance is provided for armature reaction flux, each of said segments having a recess in each of the surfaces joining said gap extending completely across said surfaces parallel to said center line and adapted to contain a portion of a spacer member, non-magnetic spacer members positioned between said yoke segments in said recesses, an outer substantially cylindrical shell of non-magnetic material around the outer periphery of said yoke segments for retaining said layers of magnetic steel in position radially, and inwardly extending flanges on both edges of said outer shell for retaining said layers of magnetic steel in position laterally.

CHARLES A. THOMAS.

REFERENCES CITED

The following references are of record in the file of this patent:

UNITED STATES PATENTS

| Number | Name | Date |
|---|---|---|
| 335,998 | Fisher | Feb. 9, 1886 |
| 1,353,658 | Kostko | Sept. 21, 1920 |
| 2,073,526 | Pestarini | Mar. 9, 1937 |

FOREIGN PATENTS

| Number | Country | Date |
|---|---|---|
| 317,781 | Germany | Dec. 31, 1919 |